United States Patent [19]

Bonsack et al.

[11] 4,094,954

[45] June 13, 1978

[54] OXIDATION OF FERRIC CHLORIDE FROM SELECTIVE CHLORINATION OF TITANIFEROUS MATERIAL

[75] Inventors: James Paul Bonsack, Aberdeen; George R. Walker, Severna Park, both of Md.

[73] Assignee: SCM Corporation, New York, N.Y.

[21] Appl. No.: 458,791

[22] Filed: Apr. 8, 1974

[51] Int. Cl.² .................. C01G 49/06; C01G 23/04; C22B 1/08
[52] U.S. Cl. ................................. 423/69; 423/149; 423/500
[58] Field of Search ............... 423/74, 75, 79, 149, 423/633, 69

[56] References Cited

U.S. PATENT DOCUMENTS

| | | | |
|---|---|---|---|
| 2,657,976 | 11/1953 | Rowe et al. | 423/74 |
| 2,675,891 | 4/1954 | Frey | 423/79 |
| 2,868,622 | 1/1959 | Bennett et al. | 423/74 |
| 2,999,733 | 9/1961 | Groves | 423/74 |
| 3,325,252 | 6/1967 | Wikswo et al. | 423/633 |
| 3,865,920 | 2/1975 | Dunn | 423/74 |

Primary Examiner—Brian Hearn
Attorney, Agent, or Firm—Jerry K. Mueller, Jr.; Merton H. Douthitt

[57] ABSTRACT

Ferric chloride from the selective chlorination of titaniferous material such as ilmenite is partially oxidized to obtain a chlorine-rich stream and byproduct iron oxide. Unreacted ferric chloride is separated as solid particles from said stream and at least a portion of said particles are returned to the chlorination operation for absorbing heat generated in such operation.

2 Claims, 2 Drawing Figures

OXIDATION OF FERRIC CHLORIDE FROM SELECTIVE CHLORINATION OF TITANIFEROUS MATERIAL

This application is cross referenced to the following applications filed on even date herewith: James Paul Bonsack U.S. Pat. Nos 3,919,400 and 3,944,647, and U.S. Ser. No. 458,509 (now abandoned) entitled "Recovering Chlorine from Ferric Chloride Vapors", "Recovering Chlorine from the Chlorination of Titaniferous Material", and "Ferric Chloride Oxidation Reactor", respectively; and the George R. Walker U.S. Ser. No. 459,034 (now abandoned) entitled "Selective Chlorination of Ilmenite and the Like with Chlorine Recovery". The disclosures of said listed applications are expressly incorporated in this one by reference.

This invention relates to an improvement in process for oxidizing ferric chloride, and more particularly to oxidizing such chloride in vapor stream from a selective chlorination of titaniferous material such as ilmenite ore, titaniferous slag, and mixtures of the same with each other, with or without the addition of rutile ore, and/or brookite ore and/or beneficiates such as the product of this process.

Selective chlorination connotes herein the removal of iron from the titaniferous feed by chlorination with chlorine gas to the substantial exclusion of titanium values, which remain in the beneficiate. This is to be constrasted with total chlorination wherein virtually all of the metal values are converted into volatile chlorides with chlorine gas.

In such selective chlorination chlorine gas and the titaniferous feed and coke are reacted to produce ferric chloride vapor mixed with very small amounts of other volatile metal chlorides such as $MnCl_2$, etc. The resulting solid beneficiate ordinarily will contain in excess of 90% titanium dioxide and a few percent of iron admixed with a small amount of unreacted coke. To make such beneficiation practical, chlorine must be recovered from the ferric chloride vapor off the chlorination. The process of ferric chloride oxidation in which the following reaction is involved is well known:

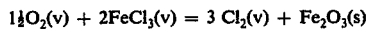

$$1\tfrac{1}{2}O_2(v) + 2FeCl_3(v) = 3\,Cl_2(v) + Fe_2O_3(s)$$

At a temperature of 600° the equilibrium is reasonably favorable towards making the products chlorine gas and solid ferric oxide, but the reaction rate is extremely slow. At temperatures of 800°–900° the rate improves markedly, but the reaction to make such products is significantly incomplete. Where ferric chloride is referred to herein as $FeCl_3$, it should be interpreted as an empirical rather than a molecular formula.

Advantages of the instant improvement include an especially efficient use of the high temperature equipment for controlling reaction temperature, recovering chlorine and iron oxide byproduct, and handling intermediate material while producing a beneficiate useful for the production of pigmentary titanium dioxide by subsequent processing involving chlorination.

The instant invention is an improvement in process for the selective chlorination of a volume of titaniferous material with chlorine gas in a chlorination zone under selective chlorination conditions wherein ferric chloride vapors are produced as a chlorination product and ferric chloride is oxidized with molecular oxygen in a ferric chloride oxidation zone under ferric chloride oxidizing conditions to obtain solid byproduct iron oxide and chlorine gas. Broadly this improvement comprises:

- in said oxidizing zone oxidizing at least a substantial portion but less than all of the ferric chloride present therein;
- venting from said oxidizing zone a stream containing unreacted ferric chloride vapor and chlorine gas;
- converting unreacted ferric chloride vapor in said stream into solid state particles;
- separating said particles from said stream; and
- passing at least a portion of said particles into said chlorination zone for absorbing heat generated therein.

Figure 1:
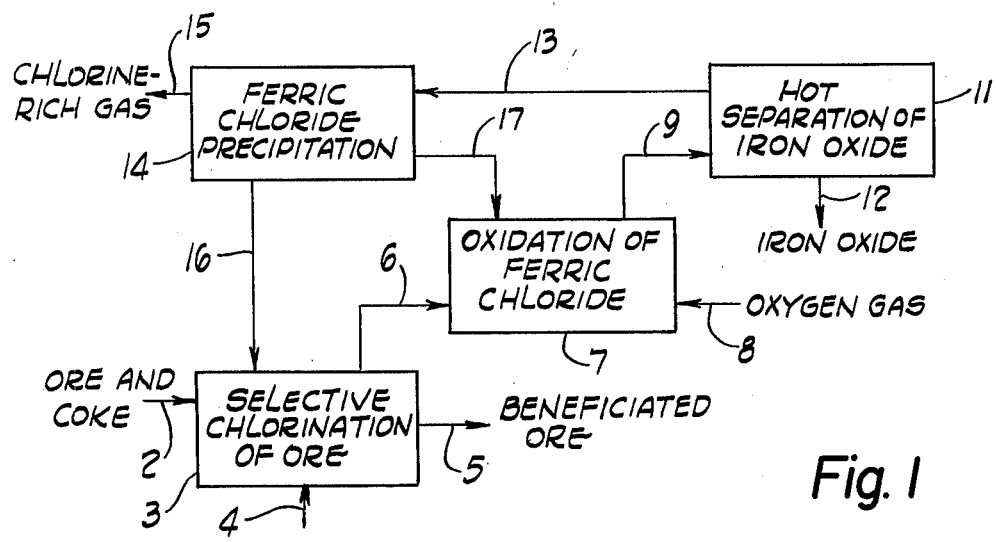
FIG. 1 is a flow diagram depicting the essence of this invention. The titaniferous feed to be beneficiated, typically ore admixed with coke, passes through inlet 2 into selective chlorination zone 3, together with a flow of chlorine entering inlet 4. The chlorination can be done in a fixed bed or in other conventional ways but preferably is performed in a fluidized bed. The solid output of the chlorination zone is the particulate beneficiated ore usually mixed with a little unreacted coke withdrawn from outlet 5.

Vapors from the chlorination zone pass through line 6 into ferric chloride oxidation zone 7, together with a flow of oxygen gas from inlet 8. The oxidation products from zone 7 are fed into inlet 9 of zone 11 wherein solid iron oxide particles are separated selectively and withdrawn from the system through outlet 12. The remaining materials are gasiform, that is vapor or gas, and these are fed through inlet 13 into ferric chloride precipitation zone 14. In this zone ferric chloride is precipitated selectively as solid state particles by reducing the temperature appropriately. Chlorine-rich gas is withdrawn from the system through outlet 15.

In an advantageous embodiment of this invention, solid state ferric chloride particles are fed via line 16 back to the selective chlorinator where they are volatilized, thus helping to absorb heat generated in the selective chlorination operation. Solid state ferric chloride particles also can be fed via line 17 back to the oxidation reaction of the ferric chloride if desired, usually to admix with the outlet vapors of this reaction zone for suppressing further oxidation at that point and absorbing some of the sensible heat of the oxidation products.

Figure 2:
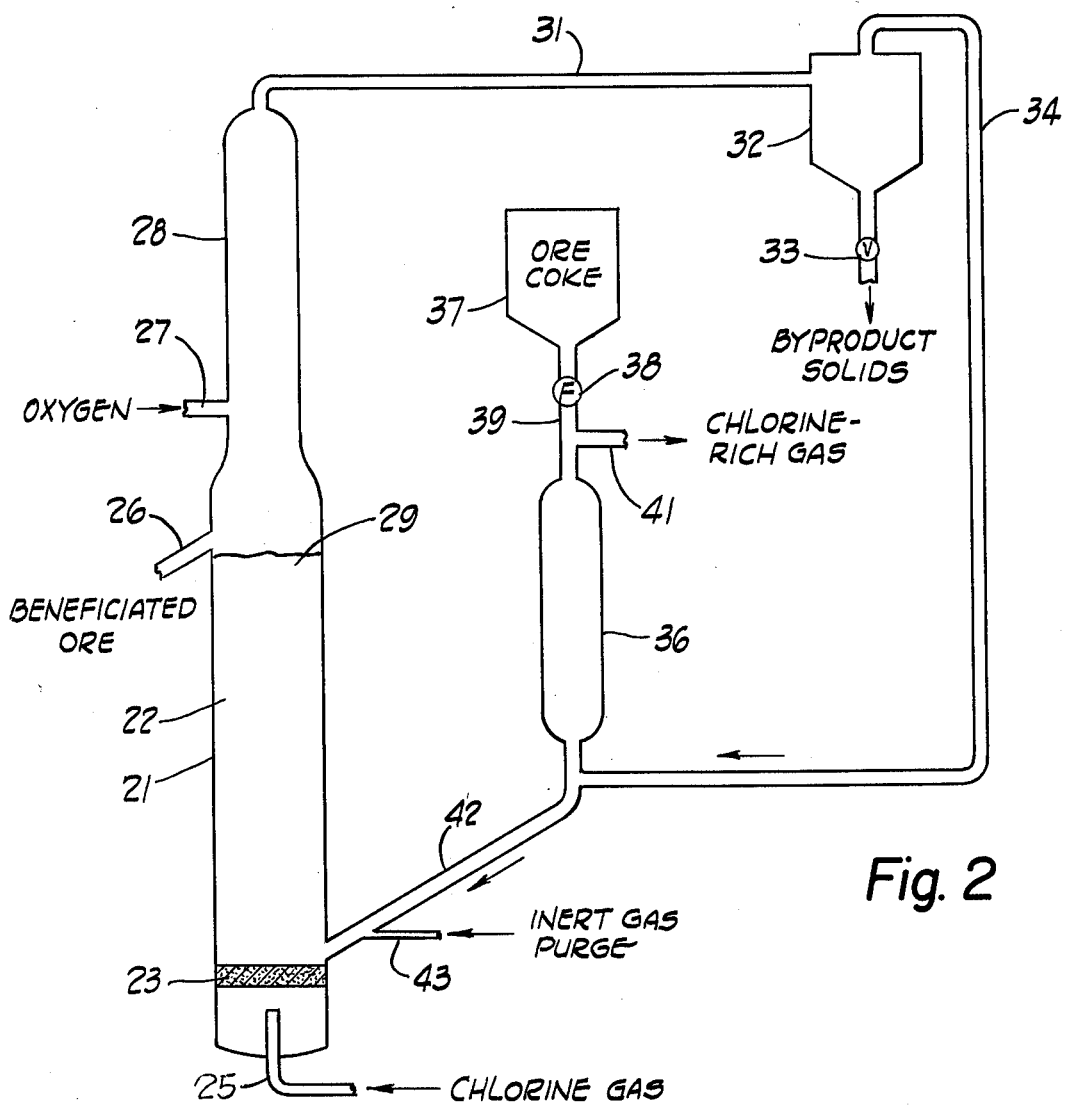

FIG. 2 is a flow sheet of a process for beneficiating ilmenite ore on a commercial scale. It will be more fully described in connection with the examples which follow.

The reactors and appurtenant exposed equipment are made of conventional materials rendering them substantially inert toward the reactions ensuing and the reaction products thereof under the conditions of operation (corrosion-resistant metals, alloys, or refractory materials such as silica, fireclay, porcelain, etc.). High-alumina fire brick is a preferred lining material for the ferric chloride oxidation zone. The piping, ductwork, and product removal apparatus will be of similar material conventionally constructed.

Selective chlorination ordinarily is done by contacting a bed of the ore to be chlorinated, suitably a fluidized bed, with chlorine and coke at a temperature of about 800° to 1000° or higher. Preferably the operating pressure is about atmospheric pressure, but this can be as high as about 2 and as low as about 0.5 atmosphere.

Advantageously the pressure in this equipment is only high enough above atmospheric in each zone and line to effectuate the necessary flow of materials indicated. Pumps, blowers, rotary valves, separators, and other conventional apparatus are used customarily in the operation.

The preferred source of oxygen for suppressing dilution of recovered chlorine most economically in the ferric chloride oxidation step is tonnage (95+%  pure) oxygen, although even purer oxygen or less pure oxygen (such as air) can be used if cost or such extra dilution can be tolerated.

The ferric chloride oxidation zone can be a single zone or a plurality of interconnected zones. For efficiency and economy a single such oxidation zone is preferred, and it is mounted atop the selective chlorination reactor for simplicity of construction and reaction control. The aforesaid oxidation of the ferric chloride in the oxidation zone should be at least about 40% complete, and generally will be between about 60% and about 90% complete when the oxidation products leave the oxidation zone.

The proportion of oxygen used to oxidize such ferric chloride in a ferric chloride oxidation zone generally is at least stoichiometric for the above reaction, and it often reaches as much as 10% in excess of such stoichiometric proportion. However, use of less than a stoichiometric proportion of molecular oxygen down to as little as about 90% of that needed to form ferric oxide with the quantity of ferric chloride being fed in the feed stream can be used also with good effect in my process as this tends to diminish the amount of free oxygen coming out in chlorine product I. The temperature for such ferric chloride oxidation generally will be between 650° and 900°, and preferably between about 700° and 800° to get a good rate of reaction with a reasonable degree of completion in a modest size reaction vessel. Preferable pressure in the operation will be approximately atmospheric, although total pressure of about ½ atmosphere on up to about 3 atmospheres can be used successfully.

Using quite pure oxygen and a ferric chloride-rich feed essentially all of vapor and gas at one atmosphere total pressure, the average residence time in the oxidation zone advantageously is between about 3 and about 15 seconds. This is calculated on the superficial basis that all of the oxygen fed is 100% pure, with instantaneous reaction of the ferric chloride and oxygen fed to equilibrium solid ferric oxygen and chlorine gas at the average temperature of the main part of the oxidizing zone, (i.e., any quenching of vapors at or near the vapor outlet being ignored) the chlorine gas product and unreacted oxygen being at such main temperature and at one atmosphere total pressure, all solids being ignored, and plug, i.e., piston flow of the chlorine and unreacted oxygen and unreacted ferric chloride vapor taking place throughout the otherwise empty oxidation zone.

Inert gas purges such as nitrogen purges commonly are utilized in solid feed inlet lines and beneficiate outlet lines of the chlorinator for preventing flow of gaseous chlorination products out of said lines. As pointed out above, fluid bed chlorination is preferred. Such operation can be initiated with the use of a bed of 6 to 7 parts of previously selectively chlorinated ilmenite mixed with one part of petroleum coke.

When the oxidation zone is mounted directly above and communicating readily with the chlorination zone below, it is advantageous to inject the oxygen into the oxidation zone so that it will not back-mix to any substantial degree with the chlorination zone solids. Hence, the oxygen inlet should be spaced substantially above the chlorination bed, and advantageously it is directed towards the central axis of the oxidation zone to suppress deposit of solids on the oxidation zone wall. It is especially advantageous to make the gas velocity in the oxidizing zone somewhat higher than the velocity immediately above the chlorination zone to help prevent such back-mixing. The gas velocity in the oxidation zone preferably is sufficiently high to suspend all iron oxide byproduct and drive it out with the gases and vapors leaving the oxidation zone. Use of a perforated plate between the oxidation zone and the selective chlorination zone also is advantageous to obtain high velocity at the vicinity of such plate and to prevent back-mixing and fall-through of solid oxidation zone materials into the chlorination zone. Superficial vapor velocity in the oxidation zone advantageously is at least about one foot per second and can be as high as ten.

It is advantageous to cool the flow of vapor products leaving the oxidizing zone to a temperature of about 600° or below to substantially arrest further oxidation. For separation of iron oxide such flow ultimately can be cooled to a temperature of about 270°–300° to use bag filtration without precipitating ferric chloride solids. Additional operating techniques will be pointed out in the examples hereinafter.

The following examples show ways in which this improvement can be practiced, but should not be construed as limiting the invention. All percentages are weight percentages, all parts are parts by weight, and all temperatures are in degrees Centigrade unless otherwise expressly noted.

EXAMPLE 1

Referring to FIG. 2 of the drawing, the following is set forth as a basis of design for ilmenite ore beneficiation on commercial scale. Fluidized bed 22, acting as a selective chlorination zone, is ilmenite ore and coke. It is maintained at 1,000° and approximately one atmosphere total pressure in chlorinator 21. The ore is Australian ilmenite (54%$TiO_2$, 30% total Fe, passing 40 mesh and retained on a 200 mesh U.S. Std. Seive). Level 29 represents the top of bed 22. A mixture of beneficiated ilmenite ore (about 92% $TiO_2$ and 3% Fe with a small proportion of unreacted coke) continuously overflows from the bed through line 26, which line is purged with a small flow of nitrogen gas not shown. Chlorine, in a proportion of 750 parts per hour per 1300 parts per hour of fresh ore and 180 parts per hour of fresh petroleum coke feed (+40 mesh) from lock hopper 37, enters inlet 25 and passes through porous support plate 23 for fluidizing bed 22.

Vapors from bed 22 (mainly ferric chloride) ascend into oxidizer 28, the oxidation zone for this operation. Substantially pure oxygen gas is passed in through inlet 27 in a proportion of 200 parts per hour. The oxidation zone is at 900° from the oxidation inlet to just below its top. The superficial vapor velocity therein as maintained slightly in excess of one foot per second for suppressing back-flow of oxygen into the chlorination zone and maintaining entrainment of all the iron oxide formed. Such superfical vapor velocity is calculated on the basis of a instantaneous reaction to equilibrium of the oxygen and ferric chloride to chlorine gas and solid iron oxide at 900° and one atmosphere total pressure while neglecting solids and assuming plug flow of the vapors through the cross section of the narrowed oxidation zone. Residence time in this zone is calculated as above set forth and is about 6 seconds whereupon about 80% of the ferric chloride ascending from the chlorination zone is converted into solid iron oxide and chlorine gas.

At the very top of the oxidation zone the exit vapors are quenched to about 600° with injection of liquid chlorine, not shown, for suppressing further oxidation. Exit vapors in line 31 are further cooled indirectly by means not shown. They discharge into separator 32 wherein iron oxide is separated at 270°–300° and removed from the system through rotary valve 33. Separator 32 is a "hot" cyclone separator followed in series by an electrostatic precipitator/bag house type iron oxide collector. Ferric chloride vapor borne in a chlorine-rich stream discharges through outlet line 34.

These vapors pass through line 34 and upwardly through vessel 36 countercurrent to a downward flow of fresh cold coke and ore feed. Such feed discharges through lock hopper 37, screw feeder 38, line 39 and into vessel 36. In vessel 36 these solids mix thoroughly with the chlorine-rich vapors from line 34 and cool such vapors to a temperature (e.g., below 200°) whereby substantially all of the ferric chloride precipitates, mostly on the ore and coke feed. Chlorine-rich product gas thus stripped of ferric chloride is withdrawn through outlet 41. The feed solids enriched by iron chloride fall downwardly into dense feed leg 42. They flow continuously from there, with a small nitrogen gas purge entering line 43, into the bottom of bed 22.

EXAMPLE 2

This design and its operation are essentially the same as that of Example 1 except for the following indicated departures.

The oxidation zone indicated by item 28 is operated at 950° whereby 70% conversion of the ferric chloride is attained in six seconds or a little less. The ferric chloride vapor borne in chlorine-rich stream exiting separator 32 by means of line 34 is sent then to a "cold" cyclone not shown (said cyclone operating at 150°–200°) to precipitate ferric chloride and discharge from the system chlorine-rich product gas substantially free of ferric chloride.

Solid ferric chloride particles are passed directly into dense feed leg 42 wherein they mix with fresh ore and coke solids for continuous feeding into the bottom of bed 22.

We claim:

1. In a process for the selective chlorination of a volume of titaniferous material with chlorine gas in a chlorination zone under selective chlorination conditions wherein ferric chloride vapors are produced as a chlorination product and ferric chloride is oxidized with molecular oxygen in a ferric chloride oxidation zone under ferric chloride oxidizing conditions to obtain solid byproduct iron oxide and chlorine gas, the improvement for recovery of chlorine gas which comprises:

in said oxidizing zone which is a single oxidizing zone oxidizing between about 40% and 80% of the ferric chloride present therein;

venting from said oxidizing zone a stream containing unreacted ferric chloride vapor and chlorine gas;

converting unreacted ferric chloride vapor in said stream into solid state particles;

separating said particles from said stream; and passing at least a portion of said particles into said chlorination zone, said particles being volatilized in the chlorination zone for absorbing heat generated therein and for oxidation in said single oxidation zone.

2. The process of claim 1 wherein said particles are generated by direct heat exchange with ore which is being fed to said chlorination zone.

* * * * *